United States Patent Office 3,041,130
Patented June 26, 1962

3,041,130
TREATMENT OF FEATHERS WITH WERNER-TYPE ALUMINUM COMPLEXES
Adolf Schubert, Chicago, Ill., and George Cohen, Framingham, Mass., assignors to the United States of America as represented by the Secretary of the Army
No Drawing. Filed Feb. 28, 1961, Ser. No. 92,424
23 Claims. (Cl. 8—94.1)

This invention relates to a method of treating feathers, especially land fowl feathers, to improve their filling power and water repellency. The treatment is durable to laundering and use, thereby making the treated feathers more suitable for use as a filler and insulating medium in sleeping bags, pillows, clothing, etc.

An object of this invention is to make land fowl feathers suitable for use in lieu of water fowl feathers as a filler and insulating material for pillows, sleeping bags, clothing, and for other uses wherein water fowl feathers have heretofore been considered to be superior.

It is also an object of this invention to improve the insulating and filling properties of land fowl feathers by imparting to them a curl which is largely retained on use and after laundering.

Another object is to improve the durability to use and laundering of land fowl feathers by imparting to them a high degree of water repellency.

A further object is to improve the resistance to decomposition of land fowl and water fowl feathers as evidenced by a lack of odor or heating when allowed to remain wet.

Still another object is to improve the insulating and filling properties of water fowl feathers, which improvement is largely retained after use and laundering.

The "filling power" of a feather filling material as it is used herein is defined as the height of a specific volume of a given weight of the material under a predetermined light load. A description of the method used to determine filling power of feather filling materials may be found in U.S. Government Military Specification MIL-F-5652C, Feathers and Down Water Fowl, dated May 29, 1953, and in a report entitled "A Proposed Method for Measuring the Filling Power of Down and Feathers," by Henry A. Sinski, Publication No. TD 103037, Office of Technical Services, Department of Commerce. The filling power determined by this method is expressed in centimeters. An apparatus for measuring the filling power of feathers is shown in Sinski et al. U.S. Patent No. 2,706,410.

Bulk or filling power and insulation value are proportional. High bulk or filling power is therefore an outstanding requirement of a filler for insulating purposes. Following are the range of filling powers, measured in centimeters, of various types of commercially available feather filling materials.

Material: Filling power (cms.)
Untreated chicken feathers _____ 1.5 to 2.5
Untreated water fowl feathers _____ 4.0 to 5.0
Mixture of 40% water fowl down and 60% water fowl feathers _____ 5.5 to 6.5
Water fowl down _____ 7.0 to 9.0

It is evident from these values that untreated chicken feathers lack the high bulk found in outstanding filling materials such as water fowl down. Water fowl feathers, while superior to chicken feathers in this respect, are inferior to water fowl down which is considered to be an outstanding filling material.

Water fowl and chicken feathers resemble each other in many respects. They differ however in that the quill or shaft of the water fowl feather is more or less curled. This curl is retained even after laundering in a confined area as in a pillow or sleeping bag. Chicken feathers are rarely curled in their natural state but can be curled by a number of relatively simple processes. Among these are treatments with a mild alkali, acid or even wetting in water, followed by drying in a relaxed state in a current of hot air. The curl obtained in this manner is not permanent however in that it is lost if the feathers are wet out and dried in a confined condition such as in a pillow or sleeping bag. The three dimensional shape of water fowl feathers, therefore, accounts for their improved filling power and insulating value when compared to chicken feathers.

Water fowl filling materials also possess a natural water repellency which is lacking in chicken feathers. This is an advantage in that it increases laundering durability and permits moisture vapor transfer without the filling material becoming degraded due to excessive moisture absorption. This water repellency is believed to be due to a natural oil coating which is lacking in chicken feathers.

Feathers are proteinaceous materials in that they are made up of feather keratin which in turn contains fibrous proteins of the general formula $NH_2CH.(R).COOH$, where R represents a number of different possible side chain groups. As such, feathers are susceptible to degradation in the presence of excess moisture with the resulting development of unpleasant odors and loss of insulating value as evidenced by a decrease in filling power.

In order to evaluate feathers treated by the process described in this disclosure, a simulated laundering test was used. It consists of determining the loss in filling power after laundering in a bag simulating a sleeping bag. The laundering procedure is the same as used in CCC-T-191b. Federal Specification Textile Test Methods, Method 5556, "Shrinkage in Laundering of Cloth, Mobile Laundry Method." The following are the results of tests carried out in this manner on representative untreated feather filling materials, which have been previously wet out and fluff-dried:

| Material | Filling Power (cms.) | |
|---|---|---|
| | Before | After |
| Chicken Feathers | 3.7 to 2.9 | 3.2 to 2.5 |
| Water Fowl Feathers | 5.6 to 4.2 | 4.7 to 3.6 |
| Mixture of 40% Water Fowl Down and 60% Water Fowl Feathers | 6.1 to 5.6 | 5.9 to 1.4 |

In accordance with this invention, it has been found that feathers treated with an aluminum complex of the Werner type have an increased filling power much of which increase is retained after laundering and drying in a confined space such as a pillow or sleeping bag. In addition, feathers treated by this method do not develop an odor when allowed to remain in a moist condition. A Werner-type aluminum complex is a compound of a trivalent aluminum salt and a carboxylic acid formed in accordance with the valence theory of Professor Alfred Werner. According to the Werner theory, atoms may exert auxiliary valences as well as the principal valences occurring in simple compounds. These auxiliary valences may act to hold various groups to the atom exerting them, and the atom exerting the principal and auxiliary valences may become the nuclear atom of a complex compound or complex ion. A typical Werner-type aluminum complex may be graphically represented by the formula

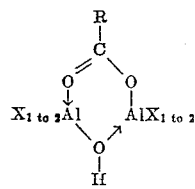

wherein the

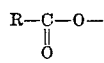

group is a functional acido group, derived from various organic acids having two or more carbon atoms in the molecule, such as myristic acid, stearic acid, gluconic acid, palmitic acid, methacrylic acid, glycolic acid, tannic acid, p-nitrobenzoic acid, p-aminobenzoic acid, cyanoacetic acid, etc. In the case of acido groups derived from fatty (saturated) acids, there should preferably be at least 8 carbon atoms per acido group; as, for instance, 14 carbon atoms in myristylato $(C_{13}H_2.COO)$

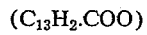

These acido groups are coordinated with a trivalent nuclear aluminum atom in accordance with Werner's valence theory; in accordance with accepted terminology, they are designated by the name of the corresponding acids with the addition of the suffix "ato." While in the illustrated graphical formula, the ratio between aluminum atoms and acido groups is 2:1, this ratio may vary within wide limits, e.g., from 1 to 10 aluminum atoms per acido group.

The term "X" in the above graphical formula may be monovalent negative ionic groups such as fluoro, chloro, bromo, formato, acetato, or nitrato. In the Werner-type aluminum complexes preferred for use in our invention, X is chloro, fluoro, or both. Surfaces which contain $OH$, $NH_2$, $COOH$, $CONH_2$ or $SO_3H$ groups are particularly susceptible to strong bond formation. The hydrocarbon end of the complex is oriented away from the treated surface and, by virtue of its hydrophobic properties, produces the ability to withstand repeated laundering as well as water repellency and maintenance of high filling power in use.

Application of the Werner-type aluminum complex to the feathers as an after-treatment, similar to the method used in the fat liquoring of leather, is not satisfactory as feathers treated in this manner do not have laundering resistance as evidenced by a marked decrease in filling power after laundering. In order to obtain satisfactory results, the aluminum complex is applied in the manner described herein.

Feathers treated by the process described herein retain much of their water repellency and filling power due to the addition of the Werner-type aluminum complex to the carboxyl and amino groups in the feather structure and the subsequent formation of a net-like hydrophilic compound. The water repellency is presumably due to the outward orientation of the hydrophobic hydrocarbon end of the complex. The aluminum compounds of the Werner-type suitable for use in this process are compounds containing carboxylic acido groups and containing aluminum in the molecule. The carboxylic acido groups may be acyclic, carbocyclic, saturated or unsaturated; they also may be fluorinated. Suitable carboxylic acido groups are, e.g., myristylato, stearato, methacrylato, glycolato, nitrobenzoato, tannato, gluconato, aminobenzoato and cyanoacetato. Complexes of this type are usually produced by processes in which contact is effected between carboxylic acido compounds and basic salts of trivalent aluminum.

Feathers to be treated according to the processes of this invention are first washed by any procedure which will leave them clean and comparatively free of blood. Such procedures are conventionally used in industry for washing feathers. The following procedure, which is used commercially, has been found to be satisfactory for wet plucked feathers. Any other washing procedure which accomplishes the same result will be satisfactory.

(a) Place the feathers in the washer. Fill washer with cold water to the half-way level. Open the bottom drain and allow the water to run out. Add water at room temperature continuously at a rate sufficient to maintain the level. Continue for 15 minutes after which the flow of water is cut off and the washer is drained.

(b) Fill the washer to the half-way level with water at 85° F. Add about one ounce of blood solubilizer, such as trisodium phosphate, to every 10 gallons of the bath. Hold 15 minutes and drain.

(c) Fill to half-way level with water at 85° F. Add sufficient non-ionic detergent, about 1 ounce per 10 gallons, to give slight suds. Hold 15 minutes and drain.

(d) The principal feather treatment in accordance with the present invention may commence at this point. However, if it is desired to put the feathers in storage without immediate further treatment, the following is applied:

Fill the washer to the half-way level with cold water. Add sufficient sodium acid fluoride to bring the pH below 5. Hold 45 minutes, drain, centrifuge, and dry.

The following examples will further illustrate the process of the invention but the invention is not restricted to these examples. All parts are by weight. The feathers may be wet as they come from the washing process, or dry. The weight of the feathers is based on dry weight. The feathers are usually fractionated to remove wing, tail and other vane feathers. If desired, the fractionation may be carried out after treatment. The method is generally the same for land fowl or water fowl feathers.

*Example I*

6.2 pounds (100 ounces) of chicken feathers were immersed in approximately 20 gallons of water at 100° F. with agitation until thoroughly wet out. Agitation was continued, and 20 ounces of sodium chloride and sufficient dilute sulfuric acid were added to bring the pH up to 4.5.

At this point 5 ounces of a Werner-type myristylato aluminum complex (Du Pont Aluminum Complex 101) were added in the form of diluted isopropanol solution, together with 10 ounces of chromium sulfate solution (e.g., Tanolin R which is about ⅓ basic chromic sulfate containing about 25% chromic oxide). The feathers were held in this bath at or slightly above room temperature for about two hours with intermittent agitation, at a pH of about 3.2, and were then removed from the bath, rinsed and dried. The initial filling power of the thus treated chicken feathers was found to be 5.6 cm., and after two launderings 4.1 cm.

The Werner-type myristylato aluminum complex (Du Pont Complex 101) solution used in the foregoing example is an isopropyl alcohol solution whose analysis indicates the presence of 2.8% by weight of aluminum, 11.8% myristylato groups (calculated as myristic acid), and 3.7% chloride (ions). Prior to adding the solution to the bath, it was still further diluted with two parts by weight (per one part of the foregoing solution) of methyl or ethyl alcohol, and water (about two gallons of water per 5 ounces of concentrated solution of the complex), and boiled.

*Example II*

Example I was repeated, except that the initial pH (prior to the addition of the Werner-type myristylato aluminum complex) was adjusted to 2.5. After addition of the Werner-type myristylato complex (5 ounces concentrated solution, diluted with alcohol and water as indicated in Example I), the pH was adjusted to 4 with a dilute solution of sodium bicarbonate added over a period of about 20 minutes. The feathers were held in the bath for an additional hour, and then removed from the bath, rinsed, centrifuged and dried. The treated feathers had an initial filling power of 5.6 cm., and after two launderings 4.3 cm.

*Example III*

Example II was repeated with the substitution of 10 ounces of aluminum chloride in lieu of chromium sulfate. The aluminum chloride was added in the form of a solution in one gallon of water adjusted with alkali to a basicity of 50–65%. The adjustment in basicity while not essential enables the treatment to be expedited and reduces the time required for the adjustment of pH. Basicity refers to the percent of total metal present, in this case aluminum, which is linked to hydroxyl groups (see Chemistry and Technology of Leather, volume 2, Type of Tannages, pages 254 and 354). After completion of the run, the treated feathers were found to have a filling power of 4.8 centimeters and after two launderings still had a filling power of 3.2 centimeters.

*Example IV*

Example III was repeated with 10 ounces of aluminum sulfate, in lieu of aluminum chloride. The filling power values of the treated feathers were the same as in Example III.

In a control experiment, untreated chicken feathers were found to have an initial filling power of 2.8 cm., and after two launderings a filling power value of 2.6 cm.

*Example V*

Water fowl feathers were treated as in Example I except that the quantity of Werner-type myristylato aluminum complex used was 40% less than the amount used in Example I. The filling power of the water fowl feathers was substantially improved, as determined by initial measurements and repeated measurements after two launderings, as compared with untreated water fowl feathers.

The pH of the initial bath may vary between about 1.2 and about 4.5; the optimum pH range being about 2.5 to 4.5, when a myristylato aluminum complex of the Werner-type is subsequently employed. After addition of the aluminum complex, we recommend adjustment of the pH of the bath to about 3–6, an optimum range being about 3.2–4.5, depending on the identity of the carboxylic acido group of the Werner complex.

The concentration of the Werner-type aluminum complex in proportion to the weight of the treated feathers may vary within a very wide range, say, from about 2.5% to about 200% of aluminum complex, based on the weight of the feathers, without substantially changing the final result in terms of filling power of treated feathers.

We recommend the addition of some common salt (sodium chloride) to the initial bath, although this step is not indispensable.

Temperature conditions of the bath may vary between room temperature (say about 70° F.) and an elevated temperature that is non-injurious to the feathers (e.g., about 200° F.). These temperatures may vary depending on the nature of the Werner-type aluminum complex used, particularly with respect to the identity of the carboxylic acido group thereof. For optimum results, we recommend a bath temperature between about 80° F. and 140° F.

We have thus shown that the methods described in the foregoing disclosure of our invention can be used to increase the filling power and stability of chicken feathers so that they can be used in place of water fowl feathers for insulation purposes. Chicken feathers in their original form are considered to be a very poor substitute for water fowl feathers. In some respects, such as launderability and resistance to decomposition, chicken feathers treated in the manner described, are superior to water fowl feathers. The methods described herein can also be used to increase the filling power and resistance to decomposition of water fowl feathers.

Reference is made to co-pending application Serial Number 816,354, filed May 26, 1959, now U.S. Patent No. 2,975,018, Adolf Schubert, George Cohen, Robert M. Delcamp and Robert M. Lollar, for "Treatment of Feathers with Werner-Type Chromium Complexes," which is assigned to the same assignee as this application.

Having thus described our invention and several modes by which the same may be carried into practice, it will be clear that several modifications and changes thereof may be made without departing from the spirit of our invention or from the scope of the subjoined claims. We thus desire to claim our invention as broadly as the prior art and the essential features of our invention will permit, and to this end have appended the following claims.

We claim:

1. A method of treating feathers to enhance their filling power, comprising placing said feathers in an acidic bath having a pH from about 1.2 to about 4.5 until equilibrium is substantially reached, then adding to said bath a solution of a Werner-type complex in which a trivalent nuclear aluminum atom is coordinated with a carboxylic acido group having at least two carbon atoms, adjusting the pH of said bath to between about 3 and about 6, and keeping said feathers in said bath until their filling power is substantially increased; removing the feathers from said bath, and rinsing and drying them.

2. Method according to claim 1, wherein the pH of the bath containing the Werner-type aluminum complex is adjusted to between about 3.2 and about 4.5.

3. The method according to claim 1, conducted at a bath temperature between about 70° F. and about 200° F.

4. Method according to claim 1, wherein said acido group is saturated and has at least 8 carbon atoms.

5. Method according to claim 1, wherein said carboxylic acido group is myristylato.

6. Method according to claim 1, wherein said bath also contains sodium chloride in solution.

7. Method according to claim 1, wherein said bath also contains a water-soluble aluminum compound in solution.

8. Method according to claim 1, wherein said bath also contains aluminum chloride in solution.

9. Method according to claim 1, wherein said bath also contains aluminum sulfate in solution.

10. Method according to claim 1, wherein said bath also contains a water-soluble chromium compound in solution.

11. Method according to claim 10, wherein said carboxylic acido group is myristylato.

12. Method according to claim 10, wherein said inorganic chromium compound is a chromium chloride.

13. Method according to claim 10, wherein said inorganic chromium compound is a chromium sulfate.

14. A method of treating land fowl feathers to enhance their filling power, comprising placing said feathers in an acidic bath having a pH from about 1.2 to about 4.5 until equilibrium is substantially reached, then adding to said bath a solution of a Werner-type complex in which a trivalent nuclear aluminum atom is coordinated with a carboxylic acido group having at least two carbon atoms, adjusting the pH of said bath to between about 3 and about 6.

15. A method of treating water fowl feathers to enhance their filling power, comprising placing said feathers in an acidic bath having a pH from about 1.2 to about 4.5 until equilibrium is substantially reached, then adding to said bath a solution of a Werner-type complex in which a trivalent nuclear aluminum atom is coordinated with a carboxylic acido group having at least two carbon atoms, adjusting the pH of said bath to between about 3 and about 6, and keeping said feathers in said bath until their filling power is substantially increased; removing the feathers from said bath, and rinsing and drying them.

16. A method of treating land fowl feathers to enhance their filling power, comprising placing said feathers in an acidic bath having a temperature of about 80° F. to about 140° F. and a pH from about 1.2 to about 4.5 until equilibrium is substantially reached, then adding to said bath a solution of a Werner-type complex in which a trivalent nuclear aluminum atom is coordinated with a carboxylic acido group having at least two carbon atoms, adjusting the pH of said bath to from about 3 to about 6, and keeping said feathers in said bath until their filling power is substantially increased; removing the feathers from said bath, and rinsing and drying them.

17. Method according to claim 16, wherein the initial pH of the bath containing the Werner-type aluminum complex is adjusted to between about 3.2 and about 4.5.

18. Method according to claim 16, wherein said carboxylic acido group is myristylato.

19. Method according to claim 16, wherein said bath also contains sodium chloride in solution.

20. Land fowl feathers having an increased filling power substantially equivalent to that of a water fowl feather, said land fowl feathers being produced by the method of claim 1.

21. Water fowl feathers produced by the method of claim 1, said feathers having increased filling power.

22. Feathers having increased filling power, said feathers being produced by the method of claim 1.

23. Feathers having increased filling power, said feathers being produced by the method of claim 5.

References Cited in the file of this patent

UNITED STATES PATENTS 2,975,018     Schubert et al. _____ Mar. 14, 1961

UNITED STATES PATENT OFFICE

CERTIFICATE OF CORRECTION

Patent No. 3,041,130                                          June 26, 1962

Adolf Schubert et al.

It is hereby certified that error appears in the above numbered patent requiring correction and that the said Letters Patent should read as corrected below.

Column 3, line 25, for "$(C_{13}H_2.COO)$" read -- $(C_{13}H_{27}.COO)$ --

Signed and sealed this 23rd day of October 1962.

(SEAL)
Attest:

ERNEST W. SWIDER                                  DAVID L. LADD
Attesting Officer                                     Commissioner of Patents